July 9, 1935. K. STROBEL 2,007,225
ELECTRIC ARC CUTTING MACHINE
Filed May 9, 1932 3 Sheets-Sheet 2
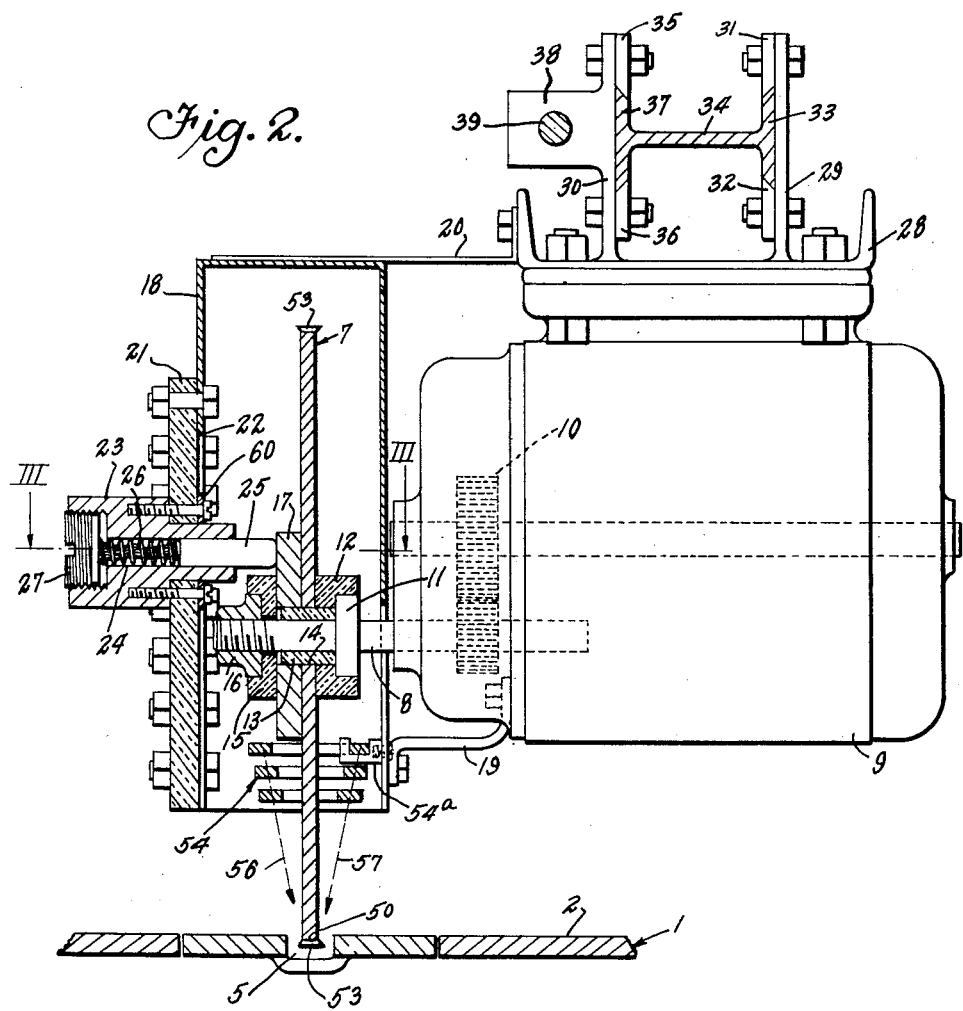
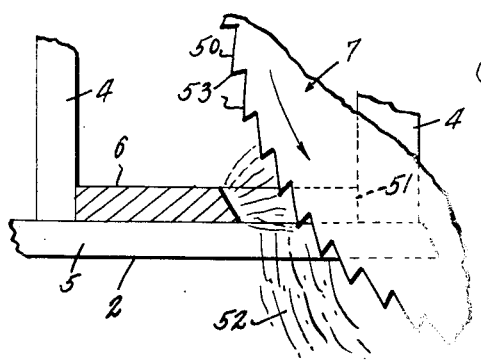
Inventor
Karl Strobel
By Lyon & Lyon
Attorneys July 9, 1935.  K. STROBEL  2,007,225

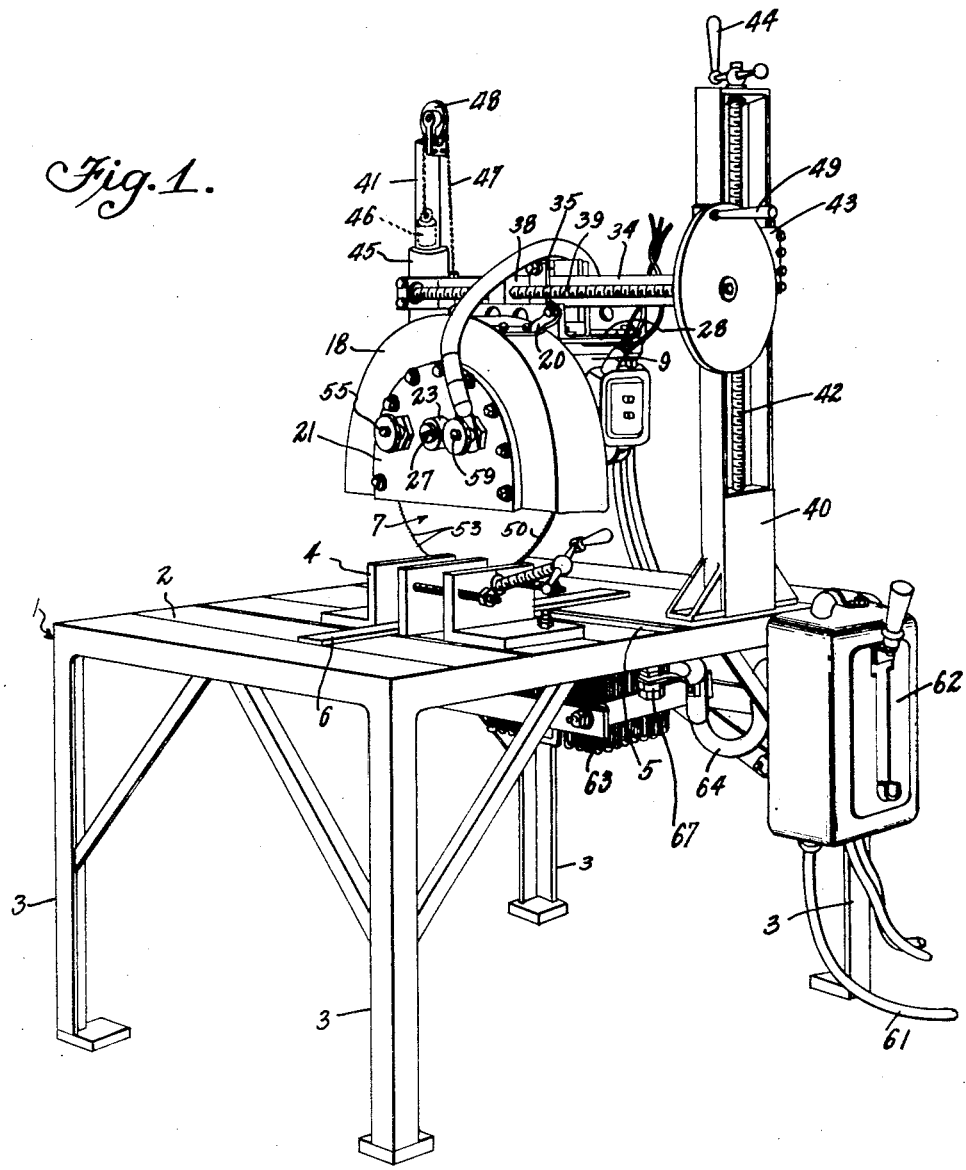

ELECTRIC ARC CUTTING MACHINE

Filed May 9, 1932  3 Sheets-Sheet 3

Inventor

Karl Strobel

By Lyon & Lyon

Attorneys

Patented July 9, 1935

2,007,225

UNITED STATES PATENT OFFICE 2,007,225

ELECTRIC ARC CUTTING MACHINE

Karl Strobel, Whittier, Calif., assignor to Karl Strobel Corporation, Puente, Calif., a corporation of California Application May 9, 1932, Serial No. 610,086

9 Claims. (Cl. 219—1)

REISSUED

My invention relates to metal arc cutting machines, and has particular reference to a device for cutting metals by means of an electric arc.

In the art of electric welding and cutting, many attempts have been made to employ an electric arc for cutting metals, all of which have operated upon the principle of employing the arc to melt or burn the metal while an oxygen blast has been directed to the metal while so heated to consume the same. Such prior devices, however, cannot be employed to make a relatively narrow cut, since it is necessary that the entire metal surrounding the cut shall be heated to the ignition point and the result is a rough, erratic line of separation between the cut sections of material. Moreover, the employment of such methods for cutting requires bringing the temperature of the metal up to the ignition point before the burning or cutting effect begins and the metal is therefore so heated that for a considerable distance on each side of the actual cut the metal is overheated.

In the case of cutting hardened or tempered metals, such overheating causes the metal on each side of the cut to become soft, or to become crystalized, depending upon the character of the metal which is cut.

It is, therefore, an object of my invention to provide a device for cutting metals by means of an electric arc in which the width of the cut is only as great as the thickness of the electrode employed to make the cut.

Another object of the invention is to provide a device for cutting metals with an electric arc in which no oxidizing agent is required.

Another object of my invention is to provide a device for cutting metals with an electric arc in which the heating of the metal is confined to a narrow band substantially equal to the thickness of the electrode employed, and in which the metal on each side of the cut remains substantially cold during the cutting operation.

Another object of my invention is to provide a device for cutting metals with an electric arc in which the finished cut presents a smooth line edge having the same appearance as though the metal had been cut by a contact saw.

Another object of my invention is to provide a device for cutting metals with an electric arc in which the metal to be cut may be harder than the material of the electrode employed for the cutting.

Another object of my invention is to provide a device for cutting metals with an electric arc in which the only mechanical contact between the cutting electrode and the workpiece to be cut is a momentary contact necessary to start the arc.

Other objects and advantages will be apparent from a study of the following specifications read in connection with the accompanying drawings, wherein Figure 1 is a perspective view of an arc cutting machine constructed in accordance with my invention;

Figure 2 is a vertical sectional view, taken through the electrode and work-table illustrating the manner of mounting the electrode and the manner of supplying current thereto;

Figure 5 is a diagrammatic view illustrating the action of the arc between the electrode and the workpiece to be cut.

Figure 3:
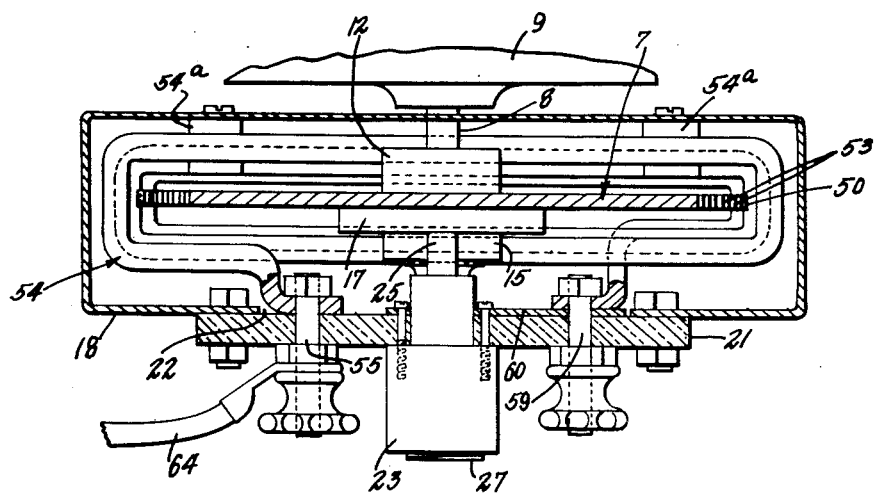
Figure 3 is a horizontal sectional view, taken along line III—III of Figure 2.

Referring to the drawings, I have illustrated my electric arc cutting machine as comprising a suitable work-table 1 having a top 2 supported upon a plurality of legs 3 to elevate the table to any suitable height. The table top 2 constitutes the support for the metal which is to be cut and which may be clamped in place thereon by means of any suitable clamping device, such as a vise structure 4 mounted upon the table top. The table top is provided with a suitable slot 5 extending therethrough over which the workpiece 6, or section of metal to be cut, may extend.

The cutting electrode is illustrated as comprising a circular disk 7, similar in construction to the circular saws now employed for mechanical contact sawing, the disk being mounted upon a suitable rotatable shaft 8 permitting the disk 7 to be rotated relative to the table 1.

The disk 7 is illustrated as being rotatable by any suitable source of power, such as an electric motor 9, the armature of which is connected to the shaft 8 either directly or through gearing 10 in order to produce the desired speed of rotation of the disk 7. Since the disk 7 is to constitute one of the electrodes employed for producing the electric arc, it is desirable to insulate the disk 7 from its shaft 8 and from the motor 9, and for this purpose I have illustrated the shaft as being provided with a suitable radial flange 11 against which an insulating disk or cup 12 may bear, presenting a plane surface against which one side of the disk 7 may be clamped. An insulating bushing 13 may be interposed between the bore 14 through the center of the disk 7 and the shaft 8, while a second cup-like washer 15 may be interposed between the disk 7 and the clamping nut 16 employed to retain the disk upon the shaft 8. In order to conduct electric current to the disk 7 a washer or ring 17 of suitable conducting material may be interposed between the insulating washer 15 and the side of the plate or disk 7.

The disk is arranged to be operated by the motor 9 at a relatively high speed, and a guard 18 may be employed to partially surround the disk 7, the guard being in the form of a semicylindrical casing supported upon the brackets 19 and 20 attached to the motor 9 or its mounting so that the guard will move with the motor 9 and the disk 7. The guard is preferably formed of nonmagnetic material to prevent creation of undesired magnetic fields around the electrode.

The guard 18 may be employed for mounting suitable electrical conducting devices supplying current to the disk 7, as, for example, by mounting a relatively large sheet 21 of insulating material upon one side of the housing or guard 18, the material of the guard 18 being cut away adjacent the inside surface of the plate or sheet of insulating material 21, as is indicated at 22. A brush mounting 23 is illustrated as being secured to the plate 21, comprising a cylindrical bushing having a bore 24 extending therethrough and through the plate 21 to mount a suitable metallic brush 25 pressed into contact with the conducting ring 17 under the influence of a suitable compression spring 26. The pressure exerted by the spring 26 may be suitably adjusted by means of a plug 27 threaded into the outer end of the brush mounting bushing 23.

Hence current supplied to the brush mounting bushing 23 will be conducted through the disk 7, while it is being rotated by the motor 9, so that an arc may be drawn between a workpiece laid upon the table-top 2 and the rotating electrode 7.

By referring particularly to Figures 1 and 2, it will be observed that the motor 9 is mounted upon a suitable mounting plate 28, illustrated as being formed from a section of conventional channel iron to which is secured a pair of vertically extending plates 29 and 30. The plate 29 is illustrated as having secured thereto a pair of runners or slides 31 and 32 to engage above and below a track 33. The track 33 is preferably formed from a section of conventional I-beam 34 with the edges of the flanges thereof beveled and machined to provide upper and lower tracks on which the slides 31 and 32 may operate. The plate 30 is also illustrated as being provided with a pair of slides 35 and 36 engaging a track 37 formed upon the other flange of the I-beam. This construction forms a mounting for the motor which permits the same to be moved longitudinally of the I-beam 34, but which supports the motor rigidly in a vertical direction. An outstanding boss 38 may be formed upon the plate 30 to constitute a nut engaging a threaded screw 39 by which the motor and its mounting may be moved horizontally along the I-beam track 34. The I-beam track is illustrated as being slidably supported upon a pair of uprights 40 and 41 so that the I-beam with its motor and disk may be reciprocated in a vertical direction. The upright 40 is illustrated as comprising a frame at the top and bottom of which a vertical feeding screw 42 may be journaled, the feeding screw engaging a suitable threaded nut structure 43 forming a nut mounting for the I-beam 34.

The screw 42 may be provided with a suitable operating handle 44 permitting the screw to be readily manipulated to elevate or lower the I-beam 34. The opposite end of the I-beam may be mounted in a similar manner or may be mounted as is illustrated herein upon a slide 45 engaging the upright 41. In order to cause the slide 45 to be elevated in accordance with the elevation of the nut 43, a suitable counterweight 46 may be connected by means of a flexible chain or cable 47 to the I-beam 34, the chain or cable passing over a suitable pulley 48 supported upon the upright 41.

If desired, the upright 41 may be formed of a tubular post with the counterweight 46 slidable within the same. Thus the manipulation of the single handle 44 may be employed to elevate or lower the motor 9 and the disk 7. The lateral feed screw 39 may be manipulated by means of a suitable handle 49 secured to the screw at the forward end thereof so that manipulation of the handle 49 will cause the motor and its disk to be moved horizontally along the I-beam track. Thus the disk may be moved to any desired position in the vertical plane in which it rotates, this plane being aligned with the plane of the slot 5 of the work-table so that the lowermost portion of the disk may pass below the level of the table-top 2.

It will be observed that the disk 7 constitutes an electrode having a relatively narrow elongated edge 50, which, upon rotation of the disk by the motor, will cause the edge of the disk to pass continuously in the same direction past the workpiece upon the table. Thus an arc is drawn between the edge of the electrode and the nearest point of the workpiece. The arc so drawn will heat a section of the metal of the workpiece immediately adjacent the electrode to the point of fusion, the speed of the movement of the edge of the electrode relative to the workpiece causing fused particles of the workpiece to be drawn in the direction of the movement of the electrode edge so that as soon as minute particles of the workpiece are melted, they are immediately drawn away from the workpiece. The arc, however, will remain between the workpiece and the nearest point of the edge of the electrode so that as each particle is removed the arc continues to melt the next portion of the workpiece material.

By referring particularly to Figure 5, it will be observed that if the electrode 7 is rotating in the direction indicated by the arrow, the mechanical contact of the electrode edge 50 with the extreme edge 51 of the workpiece 6 will cause an arc to be started between the electrode edge 50 and the workpiece 6. As the arc melts the metal, the rotation of the electrode edge will cause the particles to be drawn away from the workpiece along a line tangent to the edge 50 of the electrode 7, as is indicated at 52.

By operating the feed screw 39, the electrode is drawn toward and through the workpiece in a direction transverse to the rotation of the edge 50 of the electrode, thus permitting the arc to penetrate further through the workpiece until the edge of the electrode has passed completely through the workpiece, severing the same into two separate parts.

In order to assist the throwing out of the molten particles of the metal, the edge 50 of the electrode may be provided with a plurality of serrations or teeth 53 similar to the teeth employed upon conventional mechanical contact saws, so that the arc between the electrode edge and the workpiece is actually drawn from the points of the teeth.

While the theory of the melting and removal of the particles is not fully understood, it has been observed in actual practice that the employment of teeth of the shape shown produces the most desirable results, apparently the combined tendency of the arc to follow the trailing surfaces of the teeth with the suction created by the surfaces of the teeth passing the point of arcing, creates a force to throw particles of metal out of the cup. Also the formation of the teeth is preferably like that of mechanical contact saws in that the edge of the saw is swedged out to provide a greater width at the outer edge of the teeth than the width of the electrode disk at points closer to its center. Thus the arc which is drawn from the extreme edge of the teeth will be sufficiently wide to insure removal of the metal to form a cut, the sides of which clear the sides of the electrode disk.

In view of the fact that the cutting operation is formed entirely by the arc, and not by mechanical contact between the teeth of the electrode and the workpiece, any metal, irrespective of its hardness, may be successfully cut with an electrode which is formed of much softer metal. The primary essential characteristic of the material from which the electrode is formed is that it must be sufficiently tough to stand up under rapid rotation and must be sufficiently rigid to maintain all parts of the edge in the same vertical plane while rotating. I have employed a relatively soft steel saw, such as may be used for wood cutting, and with such saw I have succeeded in cutting metals having substantially diamond hardness. An interesting phenomenon is that with my cutting device the electrode 7 does not heat up to any appreciable extent during the cutting operation, and, in fact, immediately after the termination of a cut, the edge of the electrode may be readily grasped with the fingers and shows no substantial increase in temperature above the temperature of the surrounding atmosphere. The only mechanical contact which is made between the electrode and the workpiece is that necessary to initially draw the arc, though if so desired, this initial contact may be avoided by employing some other means for striking the arc as, for example, by touching a wire brush to both the workpiece and the electrode to start the arc or by laying a strip of carbon or other soft conducting material immediately in advance of the workpiece so that the arc may be originally drawn between this material and the electrode instead of initially drawing the arc by contact with the workpiece. However, in practice this initial contact is so instantaneous that after many cuts of extremely hard material have been made by the saw, no appreciable dulling of the tool occurs, indicating that the instantaneous mechanical contact was of such short duration that there was little or no effective mechanical contact maintained.

As the electrode enters the cut in the workpiece there is a tendency for the arc to travel inwardly along the sides of the electrode which would tend to heat the electrode and tend to burn away metal along the sides of the cut. To avoid this, a magnetic field may be created in the electrode disk which will tend to drive the arc radially from the disk and will tend to confine the arc to the edge only of the electrode. For this purpose, any suitable means for creating a magnetic field in the electrode may be employed, though in the embodiment of my invention employing a disk electrode, as shown herein, I prefer to create the magnetic field by means of a coil 54 through which the electrode projects.

By referring particularly to Figures 2 and 3, it will be observed that the coil 54 is formed by a continuous length of conducting material wound in the form of a tapered helix, the taper of which is directed toward the edge of the electrode. That is, the coil 54 may extend from a suitable terminal 55 around the interior of the guard 18 in spaced relation to the electrode 7. As the coil continues in the form of a second turn about the electrode, the periphery of the second turn is diminished, while the third turn is formed with a still further diminished periphery. The coil 54 may be supported by attaching the same in any suitable mounting to the guard 18 as by means of a pair of brackets 54a formed of suitable insulating material and attached to the sides of the guard 18

I find that the best results are achieved when the line drawn through the centers of the conductors on one side of the electrode and a line drawn through the centers of the conductors on the other side of the electrode intersect each other substantially at the edge 50 of the electrode. Such condition is illustrated by the dotted line arrows 56 and 57 in Figure 2. Thus the electrode is in effect a magnet which tends to blow the arc transversely to the direction of constant movement between the edge of the electrode and the workpiece and any tendency for the arc to creep back along the sides of the electrode is counteracted.

For simplicity in construction, the coil 54 may be formed from a bar of conducting material having a relatively great cross-sectional area sufficient to carry the current employed in the arc, and this coil may be connected in series relation with the electrode 7 so that all of the current which passes through the arc will also pass through the coil, thereby creating a blowing or driving force proportional at all times to the amount of the current employed in the arc. Thus the coil extends, as shown in Figure 3, from the terminal 55 and around the electrode 7 to a second terminal 59 which is bridged by means of a strap 60 to the brush mounting bushing 23, so that current supplied to the electrode will first pass through the coil and then pass to the electrode.

In view of the fact that at the instant of drawing an arc a substantially short circuit is created, it is desirable that some current limiting device be interposed between a source of supply and the electrode.

Figure 4:
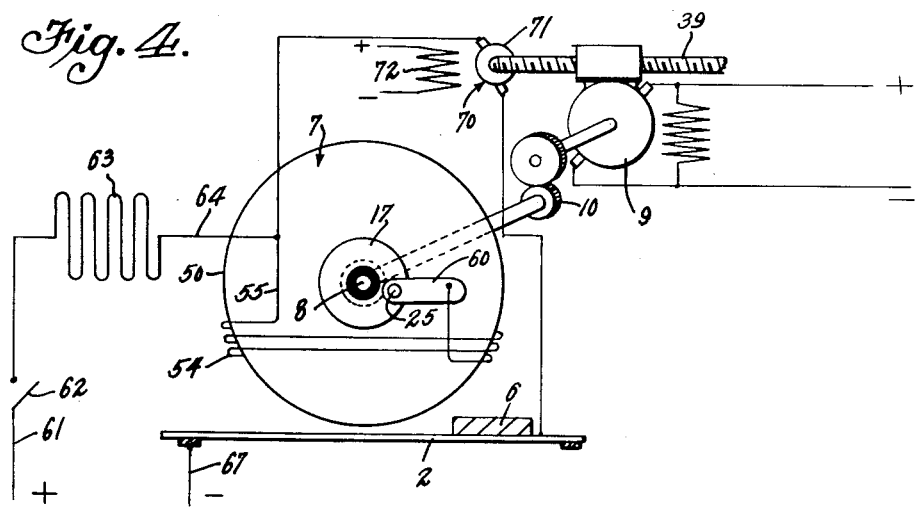
Figure 4 is a diagrammatic view of the wiring system employed in connection with my arc cutting machine.

By referring to Figure 4, it will be observed that a typical wiring system which may be employed may comprise connection of the electrode 7 to a suitable source of supply, through the conductor 61, an arc control switch 62, a current limiting resistance 63 from which a conductor 64 extends to the terminal 55. Thence the circuit extends through the coil 54, through the terminal 59, bridge 60, brush 25, contact washer or ring 17 to the electrode disk 7. The circuit is completed through the workpiece 6 and table top 2 which may be connected in any suitable manner, as by conductor 67, to the opposite terminal of a source of electric current.

While I prefer to use direct current as the supply for the arc, alternating current may be employed with substantially equally good results.

It will be observed that by confining the arc to the edge of the electrode, and by causing the arc to be projected outwardly from the electrode edge in a direction substantially transverse to the movement between the electrode edge and the workpiece, the only portion of the workpiece to be cut which will be heated will be that directly in line with the edge of the electrode. Thus no substantial heating of the metal on either side of the cut will occur. In fact, in actual performance it is found that no overheating of the metal occurs beyond 1 m. m. on either side of the cut. Hence tempered materials, such as springs and the like, may be readily cut with my saw without drawing the temper from the material to a distance greater than 1 m. m. on either side of the cut. Also, the appearance of the sides of the cut performed by my arc cutting device is smooth and straight, the appearance being identical with that of a cut made by mechanical contact saws, such as hack saws or what is known as the friction saw.

While the cutting operation may be performed with any desired speed of movement of the edge of the electrode relative to the workpiece, the best results are obtained when there is a relatively high speed of movement between these members, the greater the speed of movement, the less tendency there is for the molten particles or slag to adhere to the sides of the cup. For example, I may employ an electrode disk 18 inches in diameter and rotate the same at approximately 5,000 R. P. M., which I have found produces excellent results.

While I have illustrated my invention with the embodiment of the electrode in the form of a circular disk, it will be apparent that other forms of electrode may be used, such as an endless strap of suitable material, the primary characteristic being that the electrode must have an elongated relatively narrow edge from which the arc may be drawn and which edge may be driven past the material or workpiece to be cut at a relatively high speed.

If desired, the feeding movement of the disk toward and through the workpiece to be cut may be automatically controlled so that the arc between the workpiece may be maintained at any desired length.

The automatic control of the feeding of the electrode may be accomplished in any desired manner, such as that illustrated in Figure 4, wherein the feed screw 39, which controls the lateral movement of the electrode 7 and its motor 9, may be connected to a suitable driving motor 70, the armature 71 of which may be connected across the arc, as by connecting one terminal of the armature to conductor 64 which supplies current to the electrode 7, and connecting the other terminal of the armature 71 to the workpiece. The field winding 72 of the motor 70 is connected to any suitable constant source of energy so that as the arc length increases more current will be supplied to the armature 71 of the motor and it will rotate the screw 39 to feed the electrode toward the workpiece, while as the arc length decreases less current will be supplied to the armature 71, and the feeding movement of the electrode will be reduced.

While I have shown and described the preferred embodiment of my invention, I do not desire to be limited to any of the details shown except as defined in the appended claims.

I claim:

1. In a device for cutting metals with an electric arc, an electrode having an elongated edge, means for applying electric potential between said electrode and a workpiece to be cut to produce an arc therebetween, teeth formed upon said elongated edge having their extreme outer edges of greater width than the remainder of said electrode, means for producing continuous unidirectional movement between said electrode edge and said workpiece, and means for moving the edge of said electrode toward and through said workpiece in a direction transverse to said unidirectional movement.

2. In a device for cutting metals with an electric arc, an electrode having an endless elongated edge, means for applying electric potential between said electrode and a workpiece to be cut to produce an arc therebetween, teeth formed upon said elongated edge having their extreme outer edges of greater width than the remainder of said electrode, means for producing a continuous unidirectional movement between said electrode edge and said workpiece, and means for moving the edge of said electrode toward and through said workpiece in a direction transverse to said unidirectional movement.

3. In a device for cutting metals with an electric arc, an electrode having an elongated toothed edge, the peripheral edge of said electrode being formed of greater width than the remainder of said electrode to confine an arc to the front edge of said teeth, means for applying electric potential between said electrode and a workpiece to be cut to produce an arc therebetween, means for producing continuous unidirectional movement between said electrode edge and said workpiece, and means for moving the edge of said electrode toward and through said workpiece in a direction transverse to said unidirectional movement.

4. In a device for cutting metals with an electric arc, an electrode having an elongated edge, teeth formed upon said elongated edge having their extreme outer edges of greater width than the remainder of said electrode, means for applying electric potential between said electrode and a workpiece to be cut to produce an arc therebetween, means for producing continuous unidirectional movement between said electrode edge and said workpiece, means for moving the edge of said electrode toward and through said workpiece in a direction transverse to said unidirectional movement, and a coil in circuit with said electrode and disposed relative to said electrode to create a magnetic field therein one pole of which lies at the center of said electrode and the other pole of which lies at the peripheral edge of said electrode for confining the arc to the surface of the edge of said electrode.

5. In a device for cutting metals with an electric arc, an electrode having an elongated edge, teeth formed upon said elongated edge having their extreme outer edges of greater width than the remainder of said electrode, means for applying electric potential between said electrode and a workpiece to be cut to produce an arc therebetween, means for producing continuous unidirectional movement between said electrode edge and said workpiece, means for moving the edge of said electrode toward and through said workpiece in a direction transverse to said unidirectional movement, and a coil through which said electrode projects for creating a magnetic field in said electrode one pole of which lies at the center of said electrode and the other pole of which lies at the peripheral edge of said electrode for confining the arc to the edge of said electrode.

6. In a device for cutting metals with an electric arc, an electrode having an elongated edge, teeth formed upon said elongated edge having their extreme outer edges of greater width than the remainder of said electrode, means for applying electric potential between said electrode and a workpiece to be cut to produce an arc therebetween, means for producing continuous unidirectional movement between said electrode edge and said workpiece, means for moving the edge of said electrode toward and through said workpiece in a direction transverse to said unidirectional movement, and a coil through which the edge of said electrode projects, said coil being formed of a helix tapering toward the edge of said electrode for creating a magnetic field confining the arc to the edge of said electrode.

7. In a device for cutting metals with an electric arc, an electrode having an elongated edge, having a plurality of saw-like teeth formed thereon and having the outer edge of said teeth of greater width than the remainder of said electrode and confining an arc to the outer edge of said teeth, means for applying electric potential between said electrode and a workpiece to be cut to produce an arc therebetween, means for producing a continuous unidirectional movement between said electrode edge and said workpiece, and means for moving the edge of said electrode toward and through said workpiece in a direction transverse to said unidirectional movement.

8. In a device for cutting metals with an electric arc, a disk electrode, teeth formed upon the peripheral edge of said disc having their extreme outer edges of greater width than the remainder of said electrode, means for rotating said disk electrode, means for feeding said electrode toward and through said workpiece in a direction transverse to the axis of rotation of said electrode, and means for applying electric potential between said disk electrode and the workpiece to be cut to produce an arc between the edge of said electrode and said workpiece.

9. In a device for cutting metals with an electric arc, a disk electrode, teeth formed upon the peripheral edge of said disc having their extreme outer edges of greater width than the remainder of said electrode, means for rotating said disk electrode, means for feeding said electrode toward and through said workpiece in a direction transverse to the axis of rotation of said electrode, and means for applying electric potential between said disk electrode and the workpiece to be cut, and means for creating a magnetic field in said electrode with the center of said disk constituting one pole of a magnet and the edge of the disk constituting the other pole of the magnet.

KARL STROBEL.